(12) United States Patent
Wybo et al.

(10) Patent No.: US 8,544,232 B2
(45) Date of Patent: Oct. 1, 2013

(54) COVERING PANEL

(75) Inventors: Carlos Wybo, Oeselgem (BE); Sammy Lasseel, Smetlede (BE)

(73) Assignee: Parcolys N.V. (BE)

( * ) Notice: Subject to any disclaimer, the term of this patent is extended or adjusted under 35 U.S.C. 154(b) by 104 days.

(21) Appl. No.: 13/140,876

(22) PCT Filed: Dec. 15, 2009

(86) PCT No.: PCT/EP2009/008984
§ 371 (c)(1),
(2), (4) Date: Jun. 20, 2011

(87) PCT Pub. No.: WO2010/072357
PCT Pub. Date: Jul. 1, 2010

(65) Prior Publication Data
US 2011/0247285 A1 Oct. 13, 2011

(30) Foreign Application Priority Data
Dec. 22, 2008 (BE) .................................. 2008/0689

(51) Int. Cl.
*E04B 2/00* (2006.01)
(52) U.S. Cl.
USPC ...................................................... 52/588.1
(58) Field of Classification Search
USPC ............... 52/578, 588.1, 582.1, 584.1, 586.2, 52/590.1
See application file for complete search history.

(56) References Cited

U.S. PATENT DOCUMENTS

| | | | | |
|---|---|---|---|---|
| 6,314,701 B1 * | 11/2001 | Meyerson | | 52/588.1 |
| 6,455,127 B1 * | 9/2002 | Valtanen | | 428/137 |
| 6,682,254 B1 * | 1/2004 | Olofsson et al. | | 403/375 |
| 7,856,785 B2 * | 12/2010 | Pervan | | 52/588.1 |
| 2002/0189183 A1 * | 12/2002 | Ricciardelli | | 52/390 |
| 2003/0101681 A1 * | 6/2003 | Tychsen | | 52/783.1 |
| 2006/0117696 A1 * | 6/2006 | Pervan | | 52/588.1 |
| 2007/0240376 A1 * | 10/2007 | Engstrom | | 52/588.1 |
| 2008/0034701 A1 * | 2/2008 | Pervan | | 52/588.1 |

FOREIGN PATENT DOCUMENTS

| | | |
|---|---|---|
| EP | 1279778 A | 1/2003 |
| EP | 1808546 A1 | 7/2007 |
| GB | 2365880 A | 2/2002 |

OTHER PUBLICATIONS

EPO ISR, Sep. 13, 2010.

* cited by examiner

*Primary Examiner* — Mark Wendell
(74) *Attorney, Agent, or Firm* — Clifford D. Hyra; Symbus Law Group LLC

(57) ABSTRACT

A covering panel has a support plate, made from synthetic plastic material, with a flat and even top surface, a bottom face and pairs of opposite sides provided with complementary profile edges in the form of a male profile edge on one side and a female profile edge on the other, where said male profiled edge can be connected to a female edge of an equal adjacent covering panel, preferably according to a direction that runs perpendicular to said top surface. In their bottom face there are strip-shaped recesses that run according to the direction of extrusion and alternate with a number of support strips, of which at least a part has a width S along that bottom face that complies with 1.5T<S<10T, and whereby 0.4T<C<0.7T applies, in which C is the average depth of these recesses. A process extrudes a synthetic plastic plate.

33 Claims, 4 Drawing Sheets

COVERING PANEL

This application claims the benefit of Belgian patent application No.2008/0689, filed Dec. 22, 2008, which is hereby incorporated by reference in its entirety.

FIELD OF THE INVENTION

The invention concerns a covering panel; in particular a wall-covering panel with an extruded support plate made from synthetic plastic material and which panel is impermeable. Within this context the term wall-covering pertains to, amongst others, coverings for walls, on floors, ceilings, furniture surfaces and in particular to a floating covering for waterproof floors.

BACKGROUND OF THE INVENTION

A waterproof floor covering of this type is known from EP 1808546 of the applicant. In consideration of the increasingly stricter ecological requirements or motivations for saving materials, weight and energy, amongst others, the need arises for thinner panels, yet still with sufficient strength and shape retention and with sufficiently strong coupling or connecting elements at their edges of the panels or tiles with adjacent panels or tiles. In the relatively thick core layer of the extruded panels, according to EP 1808546, closed air channels have previously been created. Nonetheless, the weight of these panels remains too high.

Thus the need has arisen for such panels that can be designed to be almost 15% to 20% lighter. Besides that, there is an increasing, more important, ecological need for using as much recycled material as possible for the panels and as efficiently as possible. However, the application of at least a considerable portion of recycled synthetic materials, e.g. recycled PVC in the synthetic materials, creates the risk of obtaining plates with uneven strength and local differences of other characteristics spread over their volume. The recycled synthetic plastic material can be in the form of ground materials, micronized powder-shaped particles or pre-extruded synthetic strands, e.g. made of such ground materials and powder-shaped particles and of mixed granules cut from them. However, these particles or even granules of recycled synthetic material, as starting material to use, do not all have the same composition and characteristics. According to their volume, density, composition and previous use, they can comprise more or less filler materials of various compositions and shapes, both for pre-consumptive as post-consumptive recycling. Furthermore, post-consumptive recycling material often contains an extra tarnishing with the presence of foreign particles, or—for example due to ageing—the properties of the polymer sensitively deviate from new, freshly prepared polymers. Therefore, when melting and mixing upstream of the extrusion nozzles in the screw press, one obtains a melted mass with more or less heterogeneous characteristics throughout its volume, in other words characteristics that could sensitively deviate in local places in the melted mass, e.g. with regard to viscosity or rheology. This can result in varying flow patterns and/or flow rate fluctuations in the molten mass by the supply to, and passage through, the extrusion nozzles and during the passage of the cooling molten mass into the adjacent cooled calibration section.

In this way it becomes difficult to continuously realize a sufficiently and evenly dense filling over the entire width of the passage opening of the extrusion nozzle and in particular to produce a support plate with an even and flat top surface. By an even surface in this context is meant a surface on which potential irregularities protrude less than 100 microns, preferably less than 50 microns, above or under the (theoretically) intended surface level. However the realization of a support plate with such an evenly extruded top surface is necessary for guaranteeing a sufficient even top surface for the subsequent attachment of a waterproof and wear-resistant coating, and therefore also for the covering panel. Furthermore, the satisfactory imperviousness and other characteristics of the extruded support plate, according to EP 1808546, may not decrease—on the contrary.

According to EP 1808546 the opposite sides of the relatively thick panels are fitted with complementary profile edges in the shape of a tongue on the one hand, and in the shape of a groove on the other hand. The groove is bordered by an upper-lip and a lower-lip. As such the coupling or connection of adjacent panels takes place through an insertion process of the tongue on the edge of a panel into the complementary groove on the edge of an adjacent panel in a direction that is approximately parallel to the top surface of the panel. The thinner the panel the smaller also the thickness is of the tongue and of these lips that border the groove. Thus, the panel thickness cannot be reduced to below a limit whereby the connection or coupling strength of said tongue between the groove edges would become insufficient. Nonetheless, the need for extremely thin panels or tiles remains, while the strength of the tongue-in-groove connection, according to EP 1808546, possibly no longer suffices and for which another connection configuration would have to be applied.

Thus the invention has as an aim to provide an improved impermeable panel of the type known from EP 1808546 with an extruded support plate made of synthetic plastic material with a small to extremely small thickness, yet whereby the support plate and the border connections are still sufficiently strong. After all, the connections have to clamp or anchor sufficiently, at least in a cross direction (perpendicular) to the top surface for the purpose of being able to realize a durable and very flat transition between the consecutive panels in the wall covering. Moreover, when using thinner panels, the need to subsequently disconnect them from the assembled or installed wall-covering to replace them or to disassemble and reuse the covering elsewhere, remains. For this purpose, the invention also aims to use as much recycled synthetic plastics as possible—even as much as 100% of its weight—yet still preferably obtaining support plates with a very even top surface. Furthermore, the panels should preferably also have a strong sound insulating capacity.

BRIEF DESCRIPTION OF THE INVENTION

At present these requirements have been met by providing a covering panel with a support plate extruded as a single piece and made from considerably hard, preferably at least partially recycled, synthetic plastics material, with an even top surface and with pairs of opposite sides. These sides are preferably provided with complementary profile edges in the shape of a male profile edge on the one side and a female profile edge on the opposite side of said pair. According to the invention, said male profile edge of this panel is coupled in an anchoring or clamping manner, preferably with a releasable clamping mode to a female edge of the same type, or at least of an equivalent and compatible type, to an adjacent covering panel according to a transverse or crosswise direction D to said top surface.

For the purposes of being able to realize an optimal level of strength and pressure resistance for the support plate for a weight per $m^2$ of top surface that is as low as possible, it is preferable, according to an important characteristic of the invention, to create a number of open spaces on the bottom face of the plate in the form of strip-shaped recesses that follow the direction of extrusion. According to the invention, these recesses are alternated by parallel support strips of which at least a part has width S in that bottom face that complies with 1.5T<S<10T while 0.4T<C<0.7T applies to the average depth C of the open spaces. Thereby, said part of support strips with width S is substantially evenly or symmetrically spread over the width B of the support plate.

According to the invention the support plates have a maximum thickness T of nine and preferably of seven mm, e.g. with T about 6 mm or even with T<5 mm. The weight of the support plate is less than 9000 g/m$^2$, preferably lower than 6000 g/m$^2$ of the top surface. By "single-piece" is meant here that the whole support plate is formed in one extrusion step, even if that implies a co-extrusion of adjacent vertical, resp. horizontal sections of synthetic material placed side by side with mutually different compositions, e.g. a hard vertical core section and at least one softer edge section or vice versa. Also a virgin resin top layer, e.g. differently coloured, can be horizontally co-extruded with a recycled resin bottom layer.

The strip-shaped recesses will preferably have an approximate trapezium-shaped cross section with the large base of the trapezium in the surface of the bottom face of the panel. The applied synthetic plastic, e.g. PVC, will preferably be a predominantly hard synthetic material that at least for a part comprises recycled synthetic material, e.g. for at least 50% of its weight, preferably more than 80% or even over 90% up to 100% of its weight.

Said anchoring or clamping connection or coupling to a female edge of an equal adjacent panel according to a direction D that is transversally oriented to the top surface of the panel can take place through a clamping connection process to the complementary profile edges. This connection process comprises e.g. a connection of at least one rib, for example fitted on the male profile edge, to be clicked in transversely into a complementary recess in an adjacent female profile edge. This recess preferably has at least an essentially dovetail cross-section close to its entrance opening. This promotes in particular the sufficiently solid, yet simultaneously also the releasable clicking of a complementary rib into its groove. After all, the dovetail shape can contribute to an easier bending of the lip that is provided with this groove. This shape can also allow the presence of potentially desired extra dust chambers in the groove as described further on.

At least one of said ribs can thereby make contact with the bottom of an upper-lip of this male edge, while said recess stretches across the length of the top surface of the lower lip of said female profile edge. Reversely, at least of one said ribs can connect against the top face of a lower-lip of this male edge, while said recess stretches across the length of the bottom face of the lower-lip of said female profile edge.

In order to allow some flexibility or for benefiting or promoting the desired clamping effect, a suitable groove can be present in the top surface of said rib. Moreover, a more or less elastic compressible strip can be attached to said top surface of the rib. This can be done by extruding this strip at the same time as extruding the plate itself during the course of co-extrusion. In most cases the support plate of the covering panel will be coated with a common waterproof coating or foil, e.g. a HPL foil, a CPL foil, RENOLIT foil or other. Furthermore the waterproof coating or foil can be combined with a wear-resistant decorative or non decorative covering.

Additionally, the upper edges of at least two opposite sides of the panels can be provided with chamfered borders or bevelled edges. The panels also often have a rectangular top surface. The male, respectively female, profile edges according to the invention, e.g. with a coupling of the type rib-in-recess, can then only be provided on the short sides of the panel. However, they can likewise be provided onto both the short and the long sides of the panel. One can also apply a tongue-in-groove connection on the long sides and a rib-in-recess along the short sides or vice versa. Lastly, one can apply a tongue-in-groove connection to both the long and short sides.

Of course, the invention also concerns the single-piece of extruded support plate made of synthetic plastic material, e.g. predominantly made of recycled PVC, for application in a covering panel; as well as all kinds of wall coverings, including a number of covering panels connected with the aid of the features of the invention, in particular a floating covering for a waterproof floor.

Lastly the invention pertains to a unique process that allows the extrusion of a plate or support plate whereby the more or less premixed and plasticized synthetic material, with the desired additives—potentially locally in the plate—, amongst which possible filler or reinforcing particles and/or foaming agents. This plasticized synthetic material is first pressed through a suitably heated extrusion nozzle, or co-extrusion nozzle, with a suitable slot-shaped extrusion opening. Thus the process generally concerns manufacturing a synthetic plastic plate, by means of extrusion through a suitable slot opening, which has an even top surface and a bottom face that has a relief with protruding strips with sloped upright sidewalls that locally alternate with intermediate strip-shaped recesses following the direction of extrusion.

When the plasticized synthetic mixture exits this suitable extrusion slot, the plate undergoes a small volumetric expansion due to the drop out of the extrusion pressure. This freshly extruded plate is subsequently passed through a controllably cooled calibration section that is fitted with partial vacuum equipment, at least against said top surface, for producing there the local suction of that surface. The shape of the input slot of this calibration section is thereby substantially congruently chosen, but not identical with that of the extrusion slot opening.

According to an important feature of the process, the passage space for the synthetic plate for calibration in this calibration section is designed in such a way that it gradually narrows downstream, e.g. conically from its input slot to its output slot. The height of the output slot between the top surface of the plate and its bottom face at the spot (in the area) of said protruding strips is roughly equal to the thickness T of the plate. At the same time, the passage space at the spot of said intermediate strip-shaped recesses will narrow much less, or hardly at all, or not at all from its input slot to its output slot so that in that area the height (or distance) between the top surface and the bottom of the output slot is slightly bigger than T−C. Thus, passing through the calibration section probably creates a certain slowing down on the bottom faces of the strips protruding from the plate, sliding past and therefore also a gradual transversal thinning of the cooling protruding strips down to the desired roughly constant thickness T and thus beyond the extent of shrinking of the resin due to its cooling down. Furthermore, it is also presumed that this slowing down action can benefit the realization of a smooth and even top surface of the plate in addition to the suction action performed by the partial vacuum equipment, in particular against the top surface of the plate.

As a consequence of this narrowing or thinning in the calibration section, the still relatively soft excess of synthetic plastic is pressed diagonally upwards away from the protruding strips along their sloped upright edges in the upper wall of the intermediate grooves or recesses. As such, the grooves serve as collection chambers, buffers or compensation chambers for this pressed-away synthetic material against their upper wall. As a result of this, the upper wall of the groove—i.e. in the area of the small base of the trapezium-shaped cross-section of the groove—becomes less flat and less even. This, however, is not inconvenient since the groove is on the inside of the wall covering. Thus, the depth C of the grooves is in reality an average depth as a result of any irregularities in their upper wall. In contrast, the thickness T of the protruding strips should remain and indeed remain the same and constant over all plates to be linked to each other, due to these compensation chambers. Otherwise the surface of the wall covering might show an impermissible difference in level e.g. with adjacent panel edges.

BRIEF DESCRIPTION OF THE FIGURES

Details will now be explained by means of several embodiments and by reference to the attached figures. Additional aspects and benefits will be clarified in this explanation. However, the invention is not limited to the embodiments.

DETAILED DESCRIPTION

Figure 1:
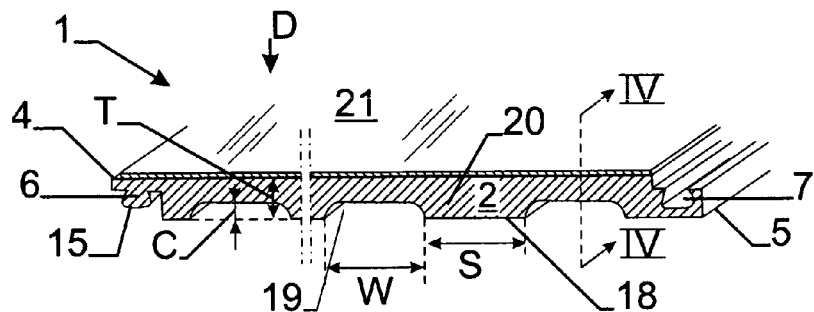
FIG. 1 is a sketch of a covering panel according to the invention.

The covering panel 1 according to the figure shows a preferred embodiment according to the invention for very thin panels with an extruded support plate 2, made from synthetic plastic material and generally with a commonly known waterproof, decorative and wear-resistant protective coating 21. These panels can have a total T thickness of 3 to 6 mm. The support plates 2 have a flat and usually a rectangular or square top surface 3. On the pair of opposite lengthwise sides 4, respectively 5 a male profile edge 6, respectively a complementary female profile edge 7 is produced, either simultaneously during the extrusion of the plate 2 or only afterwards by means of a milling process on plate edges that were not profiled during the extrusion. If so desired, profile edges 6, 7 preformed during extrusion can be finished more precisely by means of a suitable milling process afterwards.

Figure 4:
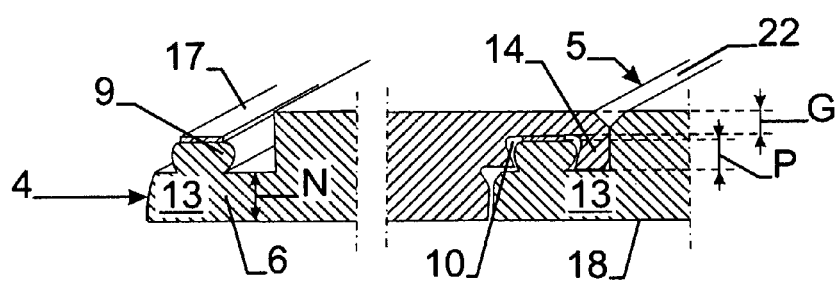
FIG. 4 concerns a similar connection possibility.

By milling, the male profile edge 36, respectively the complementary female profile edge 37, are produced at the pair of the short or cross-cut panel sides 34, respectively 35 as further discussed with reference to the FIGS. 4 to 6.

In view of maximum savings in materials for a presupposed panel strength, it is important according to the invention to create open spaces in the bottom face 18 of the panels as strip-shaped recesses 19 that run along the extrusion direction and that have been suitably dimensioned. The support strips 20 in the bottom of the panel, that were simultaneously 20 extruded, are repeatedly present in-between the consecutive recesses 19. In this embodiment according to FIG. 1, the widths W of all consecutive recesses 19 and the widths S of all intermediate strips 20 can be equal to each other: W=S. Now, according to the invention it has been found that complying with 0.5T<W<5T would be preferable for this design.

Figure 2:
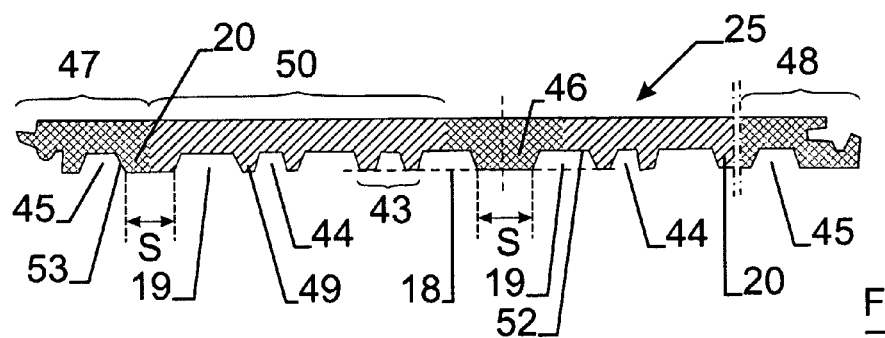
FIG. 2 shows a cross-section of another panel according to the invention with, amongst others, the application of an alternative series of strip-shaped grooves in the bottom face of a panel.

In the design according to FIG. 2, with tongue-in-groove connection at the sides parallel to the extrusion direction, support strips 20, 43, 46 are present in the bottom face 18 of the panel of which only a part, namely roughly three, have a relatively important width S: a couple of support strips 20 near the sides of the panel and a central support strip 46. Thus they are evenly and symmetrically spread over the width B of the panel. In between these broader support strips there are similar support strips 43 that each have an extra groove 44 that can be simultaneously extruded. This saves again plastic material for practically the same pressure resistance, perpendicular to the plate surface. A broad central support strip 46 is particularly beneficial because, at that spot at least, the design allows extra strong connection elements on the short or cross-cut side of the plate for a connection of tooth-in-groove or rib-in-recess.

The edge recesses 45 in the bottom face of the panel can be made slightly deeper than the other recesses 19 and 44, if so desired. This can benefit the flexibility of the profile edge zones 47, 48. If so desired, these edge zones 47, 48 can be simultaneously shaped through co-extrusion with a different composition than the intermediate central panel zone. As such, these edge zones can thus be harder or provided with reinforcing particles, for example. Even the central support strip 46 with width S can, via co-extrusion, comprise a harder or stronger synthetic material. As a result, this central support strip 46 can be given an extra strong anchoring or clamping zone on the crosscut (short) panel edge 34. One can even consider constructing only the bases 49 of a number of support strips 20, 43, 46 out of a softer synthetic material by means of co-extrusion. In particular, the zones or sections 50 between consecutive wide support strips 20, 46, 20 can be comprised of softer synthetic material, possibly foam plastic or plastic filled with fillers, such as sawdust or chalk, for example.

Figure 3:
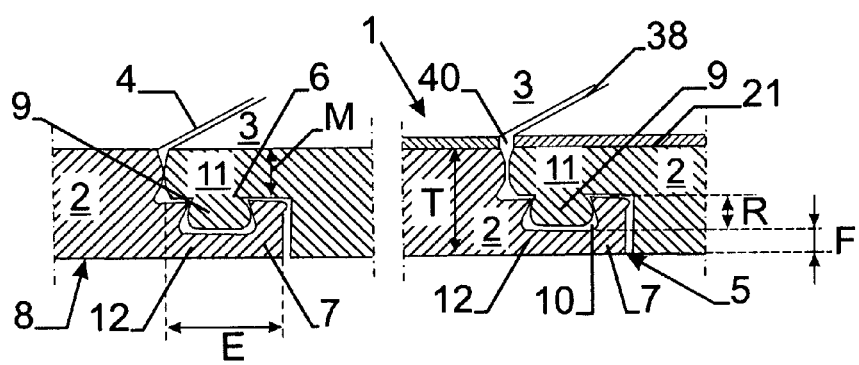
FIG. 3 illustrates a design of the clamping connections or couplings of consecutive profile edges with ribs in complementary grooves.
Figure 8:
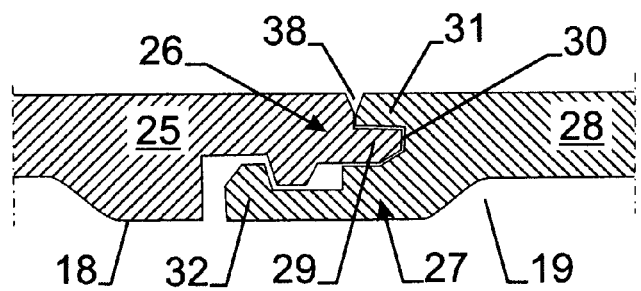
FIG. 8 pertains to a cross section of a tongue/groove connection on the side edges of the panel.

For the purposes of being able to ensure a smooth transition in the connection area of the panels 1, 25 to adjacent panels 8, 28 without a difference in level with the adjacent upper edge 38, it is important, according to the invention, to guarantee a durable clamping or anchoring connection in the direction D transverse to the top surface 21 of the adjacent panels. This is possible by applying a tongue-in-groove connection as shown in FIG. 2 or 8, but also by providing a transverse click connection of a rib 9 of the male profile edge 6, 36 in the complementary recess 10 in an adjacent female profile edge 7, 37 as illustrated in FIG. 3 or 4. For this purpose the recess 10 can have a more or less dovetail-shaped cross-section. In this case the rib 9 will have an adjusted shape with convexly curved sidewalls that clamp fittingly against the more or less concave sidewalls of the recess 10. It is also important that the connections, according to FIGS. 3 and 4 on the one hand, and those according to FIG. 8 on the other, simultaneously produce a clamping or anchoring in a direction that is parallel to the top surface 3, 21 of the connected panels to prevent the panels from sliding apart laterally. This lateral clamping can be designed as a clamping or anchoring, free from play or not, on the adjacent upper edges 38 of the connected panels.

An embodiment according to FIG. 3 and also 8 to 10 for a floating floor panel, for example, shows a particularly advantageous narrow V-groove 40 between said upper edges 38 when connected. Its point reaches all the way below the surface 3 of the support plate 2, with the purpose to prevent the opposite edges of the hard covering 21 from being able to touch each other. Indeed, plastic floor panels are generally placed on a relatively soft subfloor sheet. Now, if one should place a weight on one of the two adjacent edges 38 of such floor coverings, when walking on it for example, then it could be pressed down vertically in comparison to the adjacent edge. If the adjacent edges 38 would then come into contact, they could rub and grind against each other vertically and thereby become damaged to an impermissible extent. The created V-groove systematically avoids this disadvantage.

In the design according to FIG. 3, the rib 9 makes contact with the bottom side of the upper lip 11 of the male profile edge 6, while said recess 10 stretches across the length of the top side of the lower lip 12 of the female profile edge. On the other hand, in the design according to FIG. 4 the rib 9 makes contact with the top side of the lower lip 13 of the male edge 6, while the recess 10 stretches the bottom side of the upper lip 14 of the female profile edge 7.

The protrusion length E of said lips, from the central body of the support plate 2, will usually comply with E<7 T. The thickness F or G of the thinnest zone of the protruding lips on the female profile edge can preferably be between 0.25 T and 0.30 T, while the thickness of the thinnest zones M or N of the protruding lip on the male profile edge can preferably be between 0.35 T and 0.45 T. Furthermore, the largest thickness P of said rib 9 can be smaller than the depth R of the recess 10 in which the rib rests and whereby 0.30 T<P<0.35 T can apply. In this way it is possible in the design of FIG. 3 to have a minor clearance or play below the top surface 15 of the rib 9 that can serve as an extra dust chamber for storing leftover panel material, for example that which remains in the edge connection zones after milling the panel edges or sawing the panels. Reversely, P>R can be opted for. In this case, the top surface 15 rests on the bottom of the recess 10 in FIG. 3 and there is a small gap between the bottom side of the lip 11 and the top side of the lip 12.

It could also be advisable to attach a more or less elastic compressible strip 17 on the top surface 15 of the rib 9. This can benefit the impermeability. It can also dampen any possible creaking or grinding noises in the covering when it is periodically subjected to unevenly distributed cross-loads (according to direction D), when e.g. walking on a floor covering according to the invention. The strip 17 can be applied by means of co-extrusion.

Figure 5:
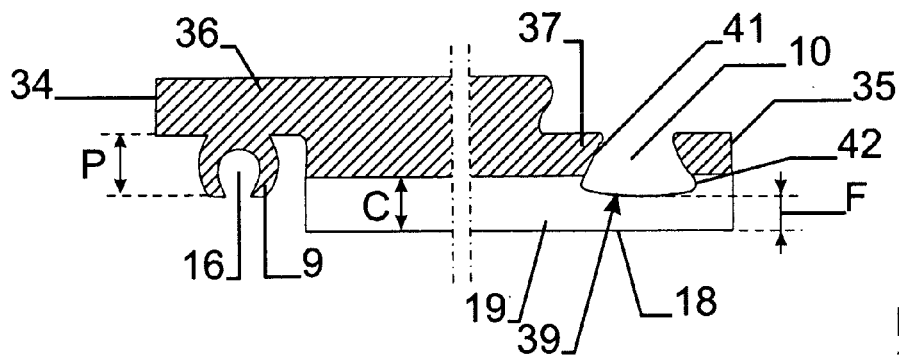
FIG. 5 is a cross section of a panel in the extrusion direction in the area of a strip-shaped recess in the bottom of the panel.
Figure 6:
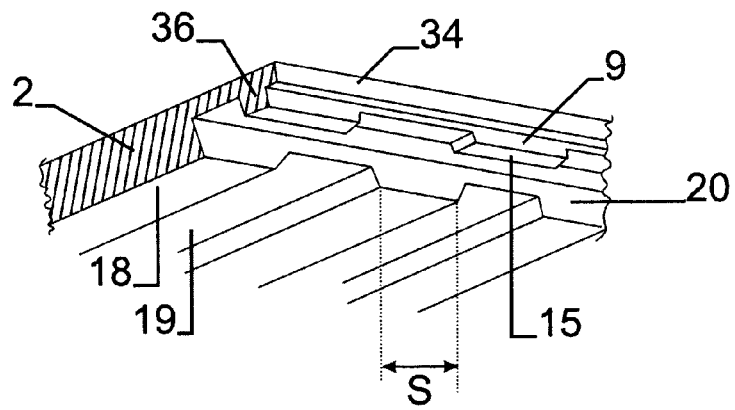
FIG. 6 is a perspective sketch of a male profile edge.

FIG. 5 shows the two cross profile edges created by milling: the male 36, respectively the female 37 on the respective opposite sides 34 and 35 of a panel. One can choose to make the depth C of the recess 19 in the bottom face 18 of the panel bigger than the thickness F of the thinnest zone of the bottom lip of the female profile edge 37. This can then result in openings 39 as clearly illustrated in FIG. 7. These openings 39 can then potentially be useful as evacuation areas for panel dust for the clamping connection of adjacent panels on those sides 34, 35. Additionally, they can help bending the bottom lip outwards a bit easier in the edge 37. This can then benefit the connecting properties if necessary. When the depth C of the recess 19 is smaller than the thickness F, respectively G of the thinnest zone of the lip 12, respectively 14, then the rib 9 will be a continuous beam and not a series of consecutive blocks as shown in FIG. 6. In this case there also will not be any openings 39 in the lips 12, respectively 14.

FIG. 5 shows a rib 9 on the bottom side of its (upper) lip on the male side edge 36, which rib is provided with a groove 16 on its bottom side. This groove can substantially improve the clicking in, respectively clicking out of the rib 9 into and out of the recess 10. As a result, the panels can be disconnected from a wall more easily, to replace them for example, in particular when all panel edges have profiles as illustrated in FIGS. 1, 3 and 5 for example. Indeed, clicking in and out takes place in a direction (D) transverse to the top surface of the panel.

Figure 7:
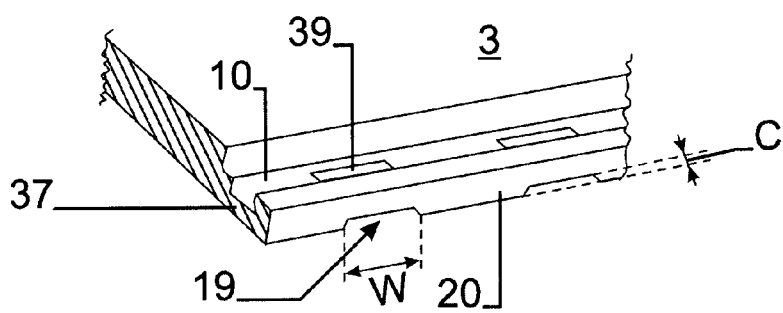
FIG. 7 is a perspective sketch of a complementary female profile edge.

FIG. 8 schematically represents the application of a tongue-in-groove connection for the adjacent coverings panels 25, 28 to their side edges 26, 27 of which said edges run parallel to the extrusion direction of their support plates. Naturally there is also a clamping here in a direction D, transverse to the top surface 3 of the support plate. A tongue-in-groove connection can then also be applied to the edges of the support plate running perpendicular to the extrusion direction. Similarly, a clamping connection can be applied to that cross edge with a rib 9 in a recess 10 as shown in FIGS. 5-7, for example. Naturally, a clamping connection with rib 9 in recess 10 can also be applied on both the panel edges running parallel to the extrusion direction and those crosswise to the extrusion direction. Lastly, one can provide a tongue-in-groove connection on said cross edges and a rib-in-recess connection on the edges in the direction of extrusion.

Figure 9:
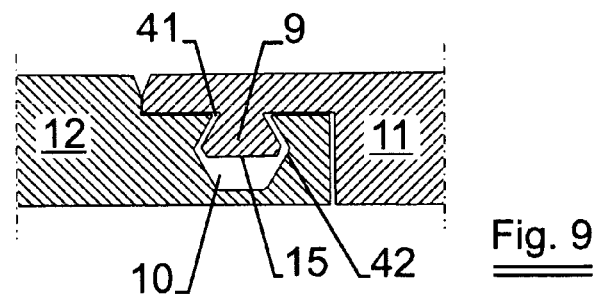
FIG. 9 is a cross-section of an alternative recess in a female profile edge with an adjusted inserted rib of a male edge.

The recess 10 in the female profile edge, according to FIG. 9, has a less explicit dovetail-shape on its bottom side that in FIG. 3 or 5, for example. Close to its entrance 41, however, the recess does essentially have a dovetail-shaped cross-section. A wise choice for the curves 42 in the bottom sides of the recesses 10 could, however, effectively regulate the balance of strength and clamping force of the lip 12 in comparison to its capacity to bend outwards. The shape of the top surface 15 of the rib can also be adapted to this appropriately if so desired.

Figure 10:
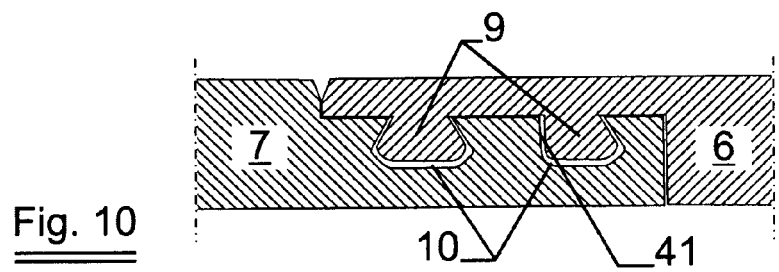
FIGS. 10 and 11 represent a design of a connection with two ribs in two recesses.
Figure 11:
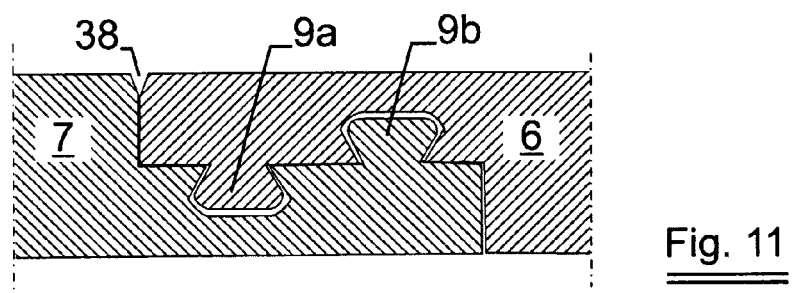

FIG. 10 illustrates a type of connection with two ribs 9 in two complementary recesses 10. This embodiment thus incorporates four clamping surfaces that could increase the clamping force or anchorage considerably. This is particularly advantageous for extremely thin panels. Here, the ribs 9 have the same orientation. In FIG. 11, however, the connection shows an orientation for rib 9a that is opposite to that for rib 9b. It is obvious that near the plate edge for the male connection part, the orientation of the rib 9a can be reversed (upwards) such as it is for 9b. It is also possible to combine a rib 9a pointing upwards with a rib 9b pointing downwards.

On the opposite sides of a support plate, parallel to the extrusion direction, the complementary male and female profile edges can either be extruded along with the rest or not. If they are not simultaneously extruded, they will have to be produced in full by means of a milling process afterwards. If they can be satisfactorily extruded with constant dimensions, a milling process afterwards might become superfluous. This can be particularly acceptable in cases where an anchorage with clearance or play is permitted. One can also simultaneously extrude the precursors of the complementary profile edges.

Figure 12:
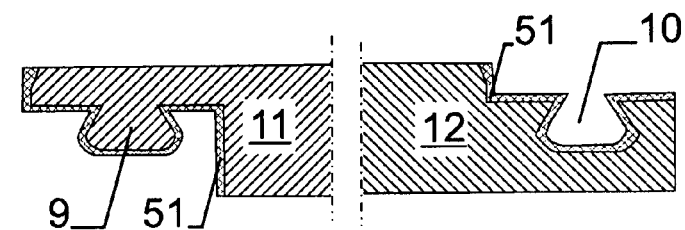
FIG. 12 illustrates a modality of extrusion, intended for an additional finish by means of a milling process.

FIG. 12 is a sketch of the extrusion of a couple of possible precursory profiles 9, 51; 10, 51 for a connection with a rib 9 in a recess 10. It is important for these precursory profiles that, during extrusion, the contour of the male edge 11 is surrounded by an excess 51 of synthetic material, which can then be milled down precisely to the desired outer-edge size of the rib 9, amongst others. This excess 51 should also be left in the inner-space of the recess 10 of the female profile edge for the purposes of a proper milling process, to obtain the correct size and shape of this recess. The excess 51 of milled-down material does not necessarily have to have the shape of a concentric layer as shown in FIG. 12. This excess can have a completely different and more extensive shape in relation to the most optimal position of the milling equipment to be used for a certain profile contour, taking into account the practically feasible tolerances during extrusion. Whichever process course one follows for creating the profile edges: extrusion and/or milling, no synthetic material is ever lost, as in any case the milled synthetic material can be collected and recuperated as a base material for recycling. So in principle, according to the invention, there will never be unusable waste.

Figure 13:
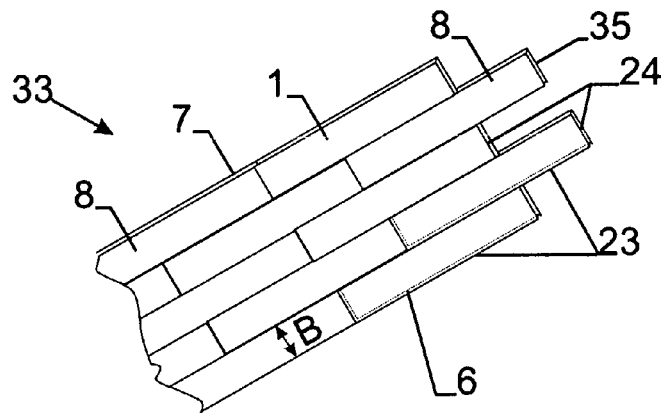
FIG. 13 shows a section of wall-covering with a number of connected panels.

The wall covering section according to FIG. 13 with adjacent rectangular panels 1, 8 with width B illustrates a top view of the protruding female profile edges 35 on the short panel sides 24. The male profile edges 6 (dotted line) protrude along the bottom side of the panel surface near the panel edges 23 (following the extrusion direction). The opposite parallel female profile edges 7 can be seen on the other side of each panel. When using the covering as a floating floor covering, it is generally placed on a flexible sheet or subfloor, made of foam material, for example. Undoubtedly the hollow open leftover spaces of the recesses 19 above this subfloor ensure the excellent sound damping qualities of the floor covering. A noise test confirmed that the sound damping properties of the wall or floor covering, according to the invention, are even better than of the (floor) covering according to EP 1808546. These recesses can also serve as ventilation channels for airing and keeping dry should, for example, moisture seep through to the subfloor between the adjacent edges 38, in particular through the openings 39 (FIG. 7) on the crosswise panel edges.

Figure 14:
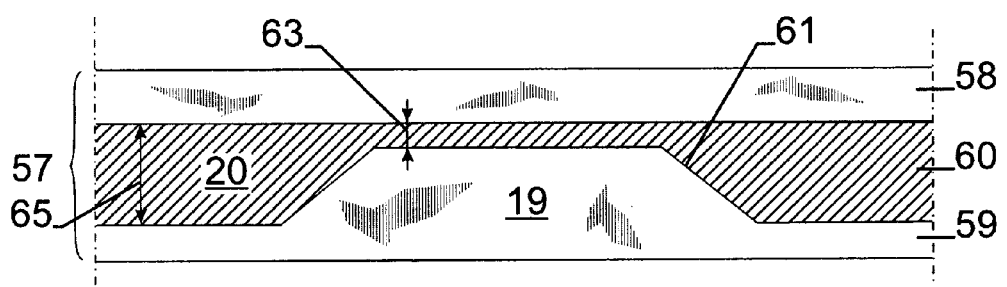
FIG. 14 relates to a front view of the exit side of the extrusion nozzle and shows a cross section of the extruded support plate.

The distinct shapes of the nozzle slots of the extrusion head and calibration section are represented in FIGS. 14 and 15. In FIG. 14 a segment is shown of the exit slot of the extrusion head 57. This head 57 has an upper mould part 58 and a lower mould part 59. In between a cross section 60 is shown of the extruded plate as it emerges from the extrusion head.

In the continuous production line for the synthetic plastic plate 2 the entrance slot 62 of the mould 54 of the calibration section is just downstream of the outlet slot of the extrusion nozzle 57. This mould 54 (FIG. 15a) has likewise a upper mould plate 55 and a lower mould plate 56. At least the upper mould plate 55 is cooled inside by circulating a cold fluid through its body (not shown). Moreover, air suction circuits in this mould plate 55 produce the desired sub atmospheric pressure to realise and maintain the close contact of the upper flat surface 3 of the advancing extruded plastic plate 2 against the cooled mould plate 55 in the cooling and calibration section.

Figure 15A:
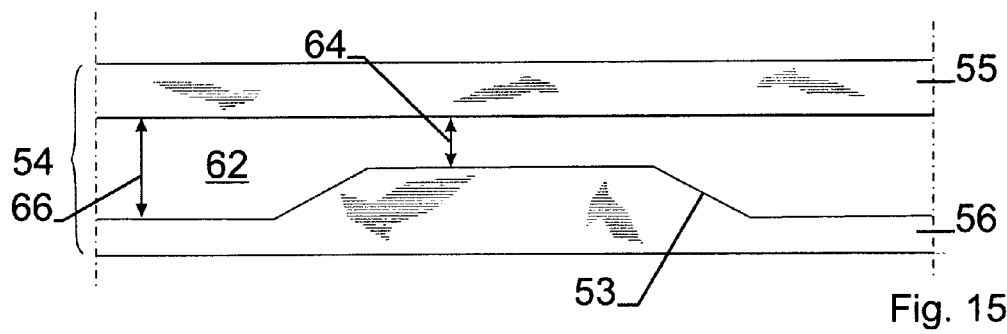
FIG. 15a, respectively 15b represent similarly the nozzle slot at the inlet end of the calibration section, resp. at the exit or outlet end of this section with a cross section view of the calibrated support plate as it leaves the calibration section.
Figure 15B:
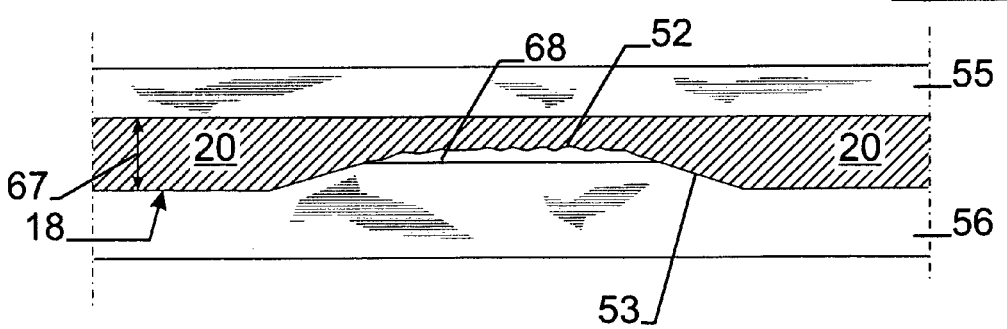

It is to be noted that the sloped upright edges 53 in the entrance slot 62 of the calibration mould 54 (FIG. 15a) may have a smaller inclination than the sloped upright edges 61 at the exit of the extrusion nozzle 57 (FIG. 14). Moreover, the thickness 63 of the freshly extruded plastic plate 60 above the recess 19 (FIG. 14) is preferably somewhat smaller than the corresponding slot width 64 at the entrance 54 of the calibration section (FIG. 15a). These measures can promote the flow in the calibration section of the plastic material from the support strips 20 (that is not yet completely solidified) towards the buffers or compensation or collection chambers 68 in the area of the intermediate recesses 19 (FIG. 15b).

The thickness 65 of the support strips 20 at the exit of the extrusion nozzle (FIG. 14) is substantially equal to the thickness 66 of the support strips entering the calibration section (FIG. 15a). At the same time the inclination of the sloped upright edges 53 at this exit (FIG. 15b) is possibly even weaker than at its entrance side shown in FIG. 15a. This may promote further an easy flow of the excess quantity of resin pushed away and upwards from the gradually transverse thinning or narrowing support strips 20 from the larger thickness 62 (FIG. 15a) to the smaller thickness 67 (FIG. 15b). Indeed the flow of this excess is pushed upwards to the intermediate recess 19 and thus to the compensation chamber 68.

As previously mentioned with regard to the specific process according to the invention, the recesses 19 serve as collection chambers 68 for the leftover synthetic material that is pushed away upwards during calibration, along their sloped upright edges 53 from the protruding support strips 20, 43, 46 in the upper wall 52 (FIG. 2) of these recesses 19. As a consequence, the eventual depth C of these recesses 19 can become slightly lower (or smaller) on average than that immediately after the extrusion nozzle and the upper wall 52 of these recesses are generally less even than the top surface 3 of the plate, or than the bottom face 18 of the support strips 20, 43, 46. This is especially advantageous for important embodiments according to the invention where recycled plastic materials are used that may contain all kinds of contaminations and dust. These particles can then be pushed away more or less in the calibration section towards the compensation chambers 68, e.g. in the somewhat uneven upper surface 52 of the recesses 19.

The invention relates thus also covering panels 1,25 with a single-piece extruded support plate 2 with a thickness T, made of synthetic plastic material, e.g. comprising predominantly a hard and at least in part recycled plastic resin, with a flat top surface 3, a bottom face 18 and with pairs of opposite sides 4,5; 29, 32; 34, 35 that are provided with complementary profile edges in the form of a male profile edge 6, 26, 36 on the one side and a female profile edge 7, 27, 37 on the opposite side of said pair, where said male profile edge 6, 26, 36 of this panel 1, 25 can be connected in a clamping or anchoring manner to a female edge 7, 27, 37 of an equal adjacent covering panel 8, 28, which have strip-shaped recesses 19 in their bottom face 18 that follow the direction of extrusion and that alternate in that place with a number of support strips 20 and wherein the upper wall 52 of these recesses 19 is on the average less even than the top surface 3 of the support plate 2.

In these covering panels at least a part 46 of these support strips 20 have preferably a width S along that bottom face 18 that complies with $1.5T<S<10T$, whereby that part is substantially evenly spread over the width B of the panel and with $0.4T<C<0.7T$ in which C is the average depth of these recesses 19.

Upon leaving the calibration section, the calibrated plate is preferably passed through horizontally and cooled in a watershoot while it can simultaneously be subjected to at least one bending process along the direction that it runs, preferably near the entrance to the watershoot. The plate is then, for example, forced to deviate from its flat trajectory through the watershoot over a guide member, placed crosswise over the shoot and that is mounted slightly above the horizontal track course in the gutter. This presumably induces tension, at least in the flat top surface of the plate, which gives it the tendency to convexly bend slightly upwards over its length after having cooled down completely.

When hot sticking the waterproof and often also wear-resistant covering foil 21 to the top surface 3 of the panel consecutively, this convex bending curve can at least partially be cancelled out, as the covered plate cools down again and the covering foil shrinks again. However, when afterwards transversely sawing the panel, that has been coated and cooled down again, to the correct unit length, the convex curve, at least partially, tends to restore itself. This is an extremely advantageous basis for subsequently connecting the panels satisfactorily to a wall covering surface. Lastly, the appropriate profile edges are produced along the circumference of the sawed panels as previously described, in particular by means of a milling process on the sawed-off cross sides or ends 34 and 35.

Of course, besides PVC there are numerous other extrudable synthetic plastic materials and compositions that are suitable as raw material for the support plates, recycled or not, or mixed with fresh polymers or mutually mixed together, such as polyolefins, polystyrene, polyesters, polyamides, acrylic polymers, vinyl and vinylidene resins, polyvinyl acetate and various copolymers, for example. Anti-static compounds and cellulose powders can also be added to the synthetic material. It is obvious that the panel properties in themselves, as listed in claims 3 to 10 and 12 to 21, but in combination with the characteristics according to claim 22, also belong the invention.

FIGS. 2 and 8 present a tongue-in-groove design and in the other figures a rib-in-recess design on the panel edges is shown with a click-in connection for both types. The invention, however, comprises also other profile edges and their connections without a click-connection, whether with or without clearance or play, but only with a pivoting movement to connect, for example, and that allows a clamping or anchoring connection, for example along a direction D running transverse to the top surface 3 of the plates or panels. It is also possible to extrude the support plate 2 and to advance it through the calibration section upside down, i.e. with its flat surface 3 as underside of the plate and the support strips 20 in its upper side. These and other variants that are obvious for a person skilled in the art, are considered to belong to or form a part of the invention.

The invention claimed is:

1. Covering panel with a width B comprising a single-piece extruded support plate with a thickness T made of hard plastics and containing recycled, synthetic plastic material, with a flat and even top surface, a bottom face and with pairs of opposite sides that are provided with complementary profile edges in the form of a male profile edge on one side and a female profile edge on an opposite side of said pair, of which a said male profile edge of said panel can be connected in a clamping or anchoring manner to a female edge of an equal adjacent covering panel according to a direction D that runs perpendicular to said top surface, whereby a number of strip-shaped recesses are present in said bottom faces, which recesses run according to the direction of extrusion and which alternate with a number of support strips of which at least a part has a width S along said bottom face that complies with $1.5T<S<10T$, whereby said part of support strips is substantially evenly spread over the width B of the panel and whereby $0.4T<C<0.7T$ applies where C is the average depth of said recesses.

2. Panel according to claim 1 of which the support plate has a maximum thickness T of nine mm.

3. Panel according to claim 1 with a weight of the support plate being lower than 9000 $g/m^2$.

4. Panel according to claim 1 whereby said recesses have a substantially trapezium-shaped cross-section with a long base W in the said bottom face.

5. Panel according to claim 1 whereby the complementary male and female profile edges comprise one or more ribs of the male profile edge that clicks crosswise into an adjacent female profile edge of which the recess has a dovetail-shaped cross-section at least near its opening.

6. Panel according to claim 5 whereby said one or more ribs border with the bottom of an upper lip of the male edge, while said recess stretches along the top face of the lower lip of said female profile edge.

7. Panel according to claim 5 whereby said one or more ribs border with the top face of a lower lip of the male edge while said recess stretches along the bottom face of the upper lip of said female profiled edge.

8. Panel according to claim 5 whereby said ribs are oriented in opposite directions in the coupling.

9. Panel according to claim 5 whereby a groove is present in the top surface of the one or more ribs.

10. Panel according to claim 5 whereby an elastic compressible strip is attached to said top surface of the one or more ribs.

11. Panel according to claim 1 whereby the synthetic plastic material comprises from 50% of its weight up to 100% of its weight of recycled PVC.

12. Panel according to claim 1 whereby the upper wall of the recesses is less even than the bottom face of the support plate.

13. Covering panel with a width B comprising a single-piece extruded support plate with a thickness T, made of synthetic plastic material and containing recycled plastic resin, with a flat top surface, a bottom face and with pairs of opposite sides that are provided with complementary profile edges in the form of a male profile edge on one side and a female profile edge on an opposite side of said pair, of which a said male profile edge of said panel can be connected in a clamping or anchoring manner to a female edge of an equal adjacent covering panel, whereby a number of strip-shaped recesses are present in said bottom faces, which recesses run according to the direction of extrusion and that alternate with a number of support strips and wherein the upper wall of said recesses is less even than the top surface of the support plate.

14. Panel according to claim 13 whereby said clamping connection on an edge of an equal adjacent panel to the complementary profile edges is in the form of a tongue of the male profile edge of said panel into a groove of the adjacent panel between an upper lip and a lower lip that border this groove.

15. Panel according to claim 14, wherein said connection is free from play.

16. Panel according to claim 13 whereby a small V groove is present in between the adjacent panel edges that has a lowermost point when coupled where the lowermost point reaches to just below the top surface of the support plate.

17. Panel according to claim 13 whereby the support plate is covered with a waterproof coating.

18. Panel according to claim 13 whereby the upper edges of at least two opposite sides are fitted with bevelled sides.

19. Panel according to claim 13 with a rectangular top surface.

20. Panel according to claim 19, whereby profile edges are present on all panel sides.

21. Panel according to claim 13 wherein at least a part of the support strips has width S along the bottom face that complies with 1.5T<S<10T, whereby the part is substantially evenly spread over the width B of the panel and with 0.4T<C<0.7T in which C is the average depth of the recesses.

22. Panel according to claim 13, whereby the complementary male and female profile edges comprise at least one rib of the male profile edge, that clicks crosswise into a adjacent female profile edge of which the recess has a dovetail-shaped cross-section at least near an entrance opening.

23. Panel according to claim 13, whereby the complementary male and female profile edges comprise a tongue of the male profile edge of said panel into a groove of the adjacent panel, between an upper lip and a lower lip that border this groove.

24. Covering panel according to claim 13 wherein the support plate is made of hard plastics and contains recycled, synthetic plastic material, with a flat and even top surface.

25. Wall covering, comprising a number of covering panels according to claim 1 coupled to each other.

26. Wall covering according to claim 25 in the form of a floating covering for a waterproof floor.

27. Covering panel comprising a single-piece extruded support plate made of synthetic plastic material, with a flat top surface, a bottom face and with pairs of opposite sides that are fitted with complementary profile edges in the form of a male profile edge on one side and a female profile edge on an opposite side of said pair, where said male profile edge of this panel can be connected in a clamping manner to a female edge of an equal adjacent covering panel along direction D that runs perpendicular to said top surface, of which the support plates have a maximum thickness T of seven mm, and which have strip-shaped recesses pointing downwards to the bottom face that follow the direction of extrusion and that alternate with a number of support strips of which at least a part has width S along the bottom face that complies with 1.5T<S<10T, whereby the part is substantially evenly spread over the width B of the panel and with 0.4T<C<0.7T in which C is the average depth of said recesses.

28. Covering panel according to claim 27, wherein the support plates have a thickness T smaller than 6 mm.

29. A process for the extrusion of a synthetic plastic plate with an even top surface and with a bottom face which has a profile of protruding strips, with slanted upright edges following the direction of extrusion that alternates with parallel-running intermediate strip-shaped recesses, comprising advancing the extruded plate emerging from an extrusion nozzle through a calibration section with controlled cooling that is fitted with partial vacuum equipment, at least against said top surface and whereby the passage space for the plate, to be calibrated in the calibration section, gradually narrows downstream from an input slot to an output slot with a height between top surface and bottom face at the spot of said protruding strips of the plate on the output slot that is equal to the thickness T of the plate, while the passage space at the spot of said intermediate recesses narrows much less or even not at all from its input slot to its output slot, so that in that area the height between the top surface and the bottom of the output slot is larger than T-C, due to the presence of compensation chambers.

30. Process according to claim 29, whereby the calibrated plate is consequently passed through and cooled down in a water shoot, while it is simultaneously subjected to at least one bending process along the direction it runs.

31. Process according to claim 30, whereby a heated coating is stuck to the top surface of the synthetic plastic plate.

32. Process according to claim 31, whereby the plate is sawed into panels of appropriate length and whereby the appropriate milling process is carried out at the profile edges and of the sides.

33. Wall covering, comprising a number of covering panels according to claim 13 coupled to each other.

\* \* \* \* \*